May 10, 1932. E. J. VALLEN 1,857,673
STAGE OR SCREEN MODIFIER
Filed May 31, 1930 3 Sheets-Sheet 1

INVENTOR
EARL J. VALLEN
By Ely T Barrow
ATTORNEYS

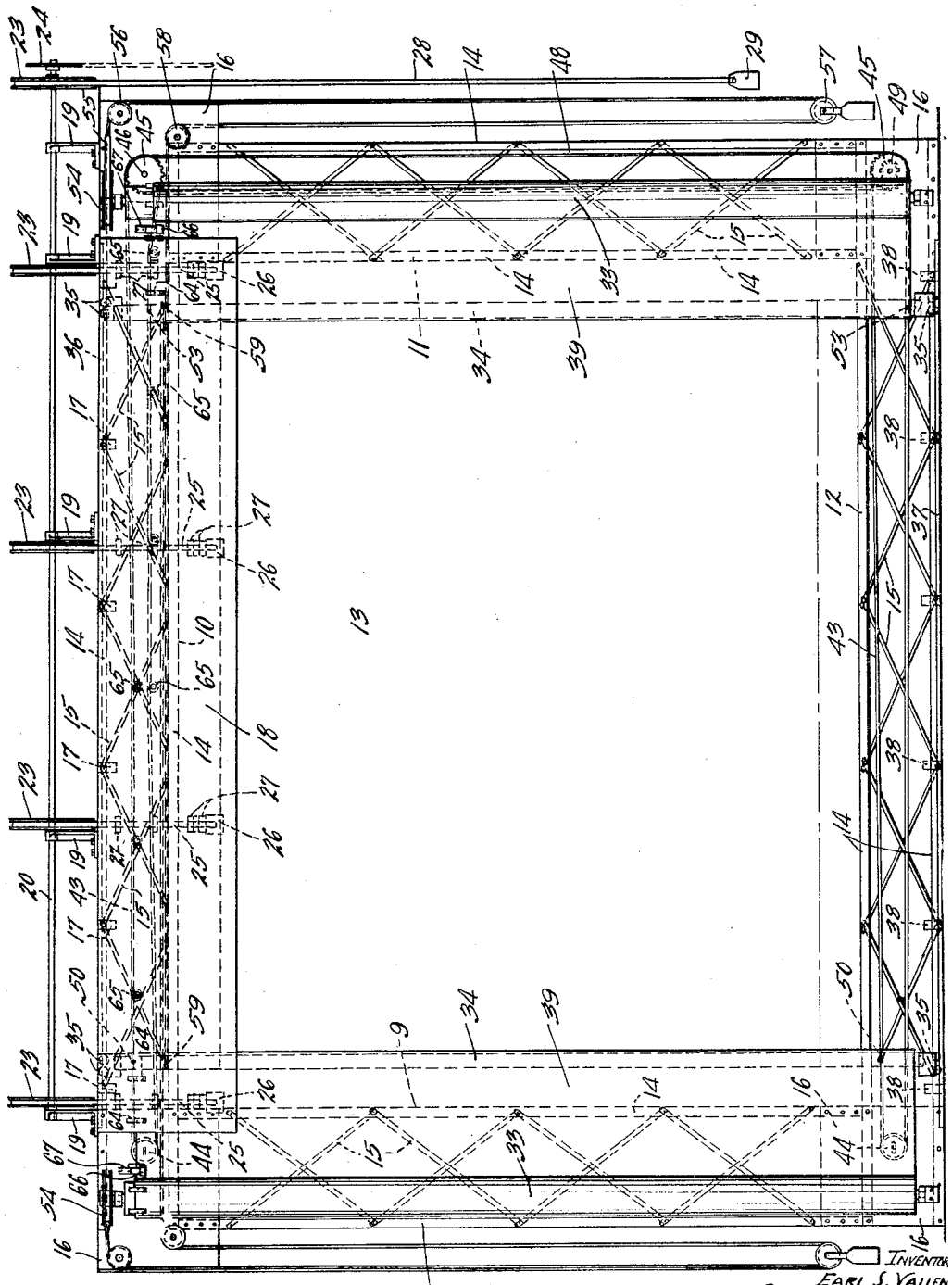

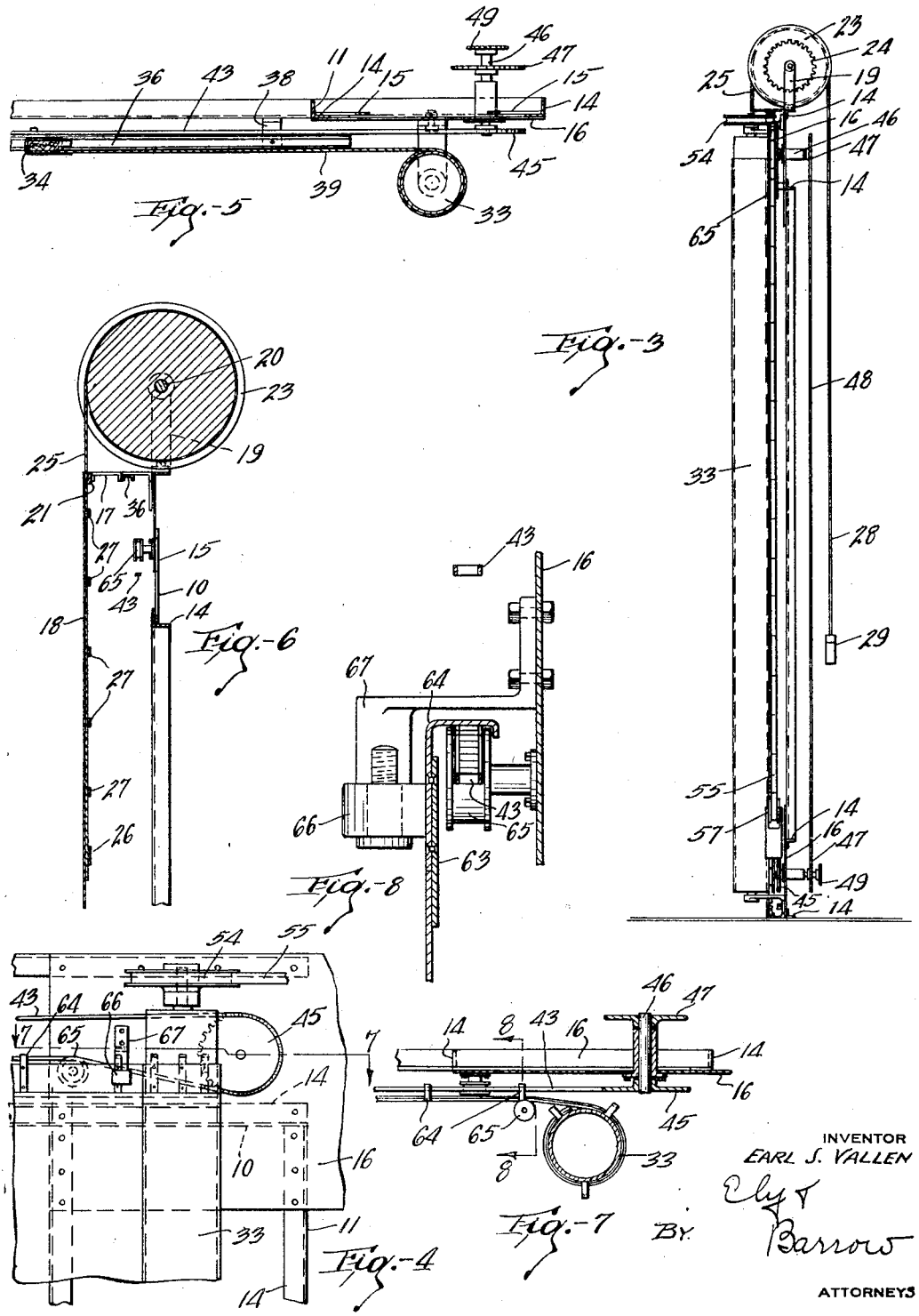

Patented May 10, 1932

1,857,673

UNITED STATES PATENT OFFICE

EARL J. VALLEN, OF AKRON, OHIO

STAGE OR SCREEN MODIFIER

Application filed May 31, 1930. Serial No. 458,287.

This invention relates to means for varying or modifying the shape and area of a display opening such as a moving picture screen or a stage opening. It is particularly applicable in the moving picture field, although the invention is not necessarily so limited and may be employed for other purposes.

It is often desirable to adjust both the shape and area of the projection screen or of the stage opening to meet the requirements of present day moving pictures or stage effects. However, considerable difficulty has been experienced in rapidly and effectively producing the desired changes.

The general object of the invention is to provide improved, inexpensive, easily operated apparatus which will meet the necessary requirements and which will operate in a rapid and efficient manner.

A more particular object of the invention resides in the provision of masking curtains which are held smooth and flat in all positions thereof.

Again it is an object of the invention to provide improved means for supporting and operating the masking curtains so that they are moved without sagging and are maintained in correct vertical position at all times.

The above and other objects of the invention are achieved by the apparatus illustrated in the accompanying drawings and described below, it being understood that the invention is not limited to the specific details thereof shown and described.

In the drawings which illustrate the application of the invention to a moving picture screen:

Figure 2 is a view similar to Figure 1 with the masking curtains in a retracted or non-screening position;

Figure 3 is an end elevation of Figure 1 looking from the right thereof;

Figure 4 is an enlarged view of the upper right hand corner of Figure 1;

Figure 5 is an enlarged sectional view taken on line 5—5 of Figure 1;

Figure 6 is an enlarged sectional view taken on line 6—6 of Figure 1;

Figure 7 is a sectional view on line 7—7 of Figure 4; and

Figure 8 is an enlarged sectional view taken on line 8—8 of Figure 7.

Figure 1:
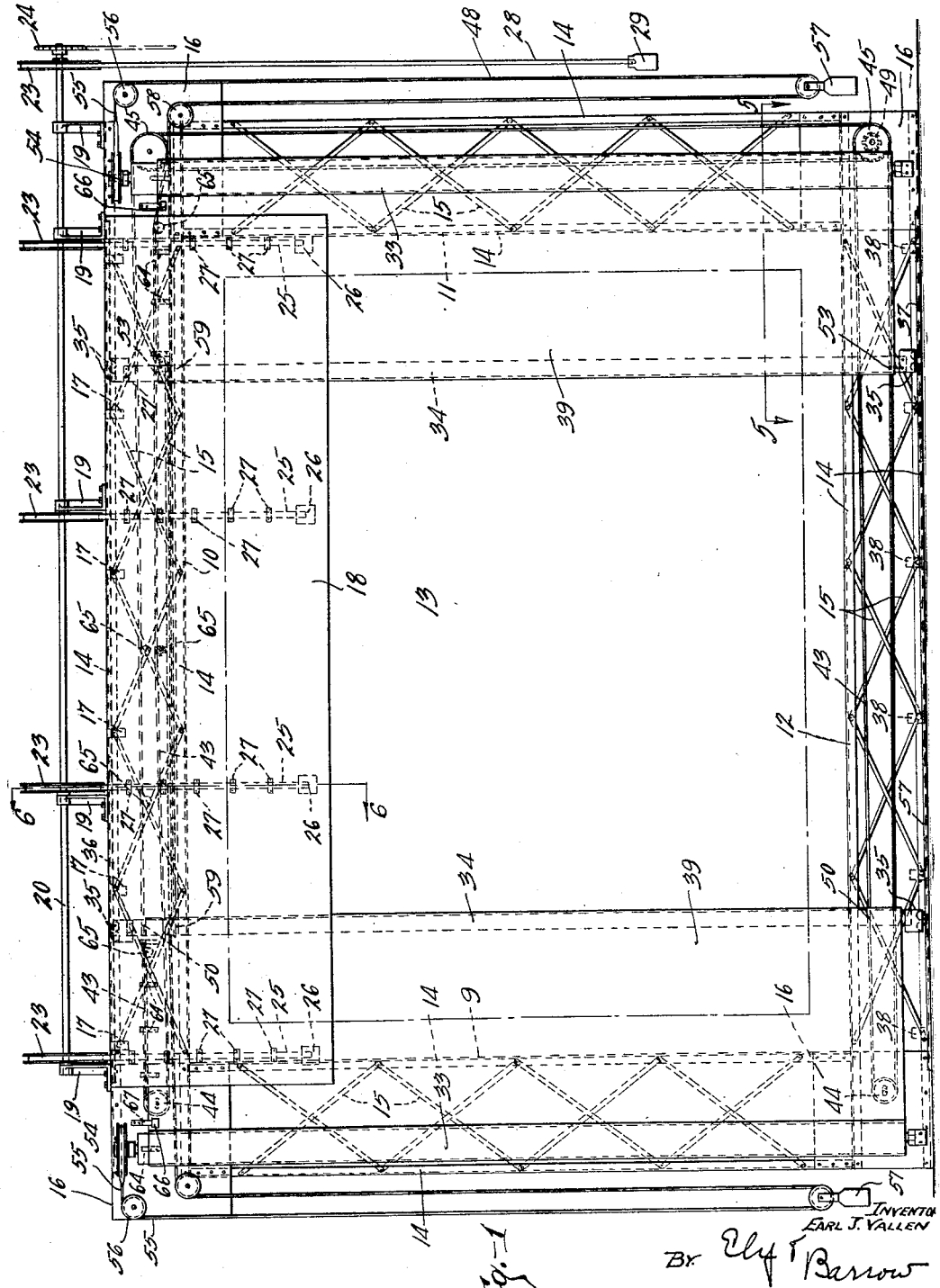
Figure 1 is a front elevation of the invention with the masking curtains in reduced or screening position.

The invention comprises a four-sided frame 9, 10, 11 and 12 which serves to carry or frame a screen 13. The frame may be of any suitable construction, but as illustrated comprises parallel angle irons 14 at each side of the frame, connected by strengthening lattices 15 and corner plates 16.

Secured to the top of the upper side 10 of the frame and extending laterally thereof are a plurality of channel-shaped brackets 17 (best seen in Figure 6), to the ends of which is fixed a cross bar 21 which serves to support a masking curtain 18 of suitable light-absorbing cloth. Journaled on the upper side 10 of the frame, in a plurality of brackets 19, is a long shaft 20, to which shaft are secured a plurality of spaced, flanged pulleys 23 and a driving sprocket 24. Suitable means (not shown) are provided to drive the sprocket 24. Coiled on the pulleys (Figure 6) are flat webs or tapes 25 which extend therefrom down behind the masking curtain 18, the ends thereof being secured as at 26 to the lower edge of the masking curtain 18. A number of equally spaced loops 27 secure the tape 25 to the back of the masking curtain 18.

As seen in Figures 1 and 3, the pulley 23 at the end of the shaft has a tape 28 coiled thereon in a reverse direction to that of the other tapes, to which tape is secured a weight 29. In this manner the weight of the curtain is substantially counterbalanced as well as providing hand means for the operation of the shaft 20.

A pair of long rolls 33 are journaled between opposite end plates 16 in parallel relation with the sides 9 and 11 of the frame. Co-operating with the rolls 33 to support the side curtains are battens 34, preferably of wood, the ends of which are slidably carried in the upper and lower members 10 and 12 of the frame. To this end rollers 35 are provided at the ends of the battens which ride in tracks 36 and 37 secured to the brackets 17 and to brackets 38 on the upper member 10 and the lower member 12, respectively. Carried between each roller 33 and its cooperating batten 34 is a side masking curtain 39 of material similar to the top masking curtain 18.

To control the position of the battens 34 with respect to the rolls 33, endless chains 43 are provided in the upper and lower members 10 and 12 which extend around suitably journaled, flanged idler pulleys 44 at one side of the frame and about driving sprockets 45 at the other side of the frame. Referring to Figures 3, 5 and 7, the sprockets 45 are fixed to shafts 46 journaled in the corner plates 16 of the frame, which shafts are extended and carry aligned sprockets 47 connected by an endless chain 48. A driving sprocket 49 is also secured on the lower shaft 46 which is connected to suitable actuating means, not shown. The batten 34 on one side of the frame is connected as at 50 to the top side of the endless chain 43 and the batten 34 on the other side of the frame is connected to the bottom side of the chains as at 53. In this manner when the driving sprocket 49 is rotated, the battens will move toward or from each other.

The side masking curtains 39 are kept flat and smooth through the agency of suitable mechanism including flanged pulleys 54 which are fixed to the top of the rolls 33. About the pulleys 54 are coiled tapes 55, the free ends thereof extending over idler pulleys 56, down and around pulley weights 57, over idler pulleys 58, and then to the batten 34 opposite to the one with which the roll 33 normally cooperates, as at 59 (see Fig. 1).

The chain 43 carried on the upper member 10 of the frame not only serves to move the battens 34 back and forth, but also serves to support the upper edge of the side curtains 39. To this end the upper edges of the side curtains 39 are reinforced with strong flexible webbing 63 (Figure 8), to which are fastened a plurality of hooks 64 which, as the curtain unrolls, move over the horizontal chains to support the side curtain. From a study of the drawings, especially Figure 1, it will be seen that one side curtain 39 is supported on the upper stretch of the top chain 43 and the other side curtain 39 is supported on the lower stretch of the top chain 43. The supporting of the curtains in this manner conforms with the fastening of the battens 34 to the top chain 43 in that the curtains are supported on the same stretch of the chain as that to which their respective batten is secured. A plurality of spaced idler rollers 65 are provided to carry the supporting stretches of the chain 43.

Where the side curtain 39 is supported on the top stretch of the chain 43, it will be seen that the supporting hooks 64 will move off the chain and about the roll 33 in the inward movement of the batten 34 without difficulty since the chain loops down and around the idler pulley 44. However, where the side curtain 39 is supported on the lower stretch of the chain 43, more difficulty is experienced in moving the hooks 64 off the chain so that the curtain can be rolled on the roll 33. For this purpose the lower stretch of the chain 43 is offset or raised by the idler pulleys 65 (Figures 1, 4 and 8) above the lower edge of the sprocket 45, so that as the curtain moves towards the roll 33 the chain 43 drops away from under the hooks 64 and allows them and the curtain to be wrapped about the roll 33.

Pressure rollers 66 journaled on brackets 67 are preferably provided adjacent the rolls 33 to insure that the hooks 64 properly engage with chain 43.

The bottom member 12 of the frame is covered with masking material (not shown for the sake of clearness) similar to the curtain material.

The operation of the mechanism is as follows:

If it is desired to change the size of the screen 13 in a vertical direction, the top masking curtain 18 is raised or lowered by turning the shaft 20 by way of drive sprocket 24 which is connected to suitable operating means (not shown). The rotation of the shaft 20 will wind the tapes 25 on or off the flanged pulleys 23, which tapes being secured at their ends to the bottom of the curtain 18 will raise or lower the curtain. The tapes 25 will slide in the loops 27 until the points 26, where the tapes are fastened to the curtain, engage with the loops in succession to pick the loops up and carry them and the curtain up with the tapes, the curtain gathering in folds at the upper side of the screen opening. In this manner by the rotation of the shaft 20, the top masking curtain can be moved up or down to cover more or less of the screen 13. It will be seen that the curtain, in moving up, is folded or pleated in the successive pick-up of the loops 27.

The side masking curtains 39 are controlled independently of the top curtain 18 and serve to vary the width of the screen 13. The sprocket 49 is driven by suitable means (not shown) to move the chains 43. The batten 34 at one side of the frame being connected to one stretch of each chain, as at 50, and the batten at the other side being connected to the other stretch of each chain, as at 53, causes the battens to move towards and from each other upon the rotation of the sprocket 47 as will be apparent. The pulley weights 57 carried by the tapes 55 hold the side curtains 39 flat and smooth by applying a constant yieldable torque to the rolls 33 and by yieldably holding the battens 34 at the limit of their outward movement. As the battens 34 move away from their cooperating rolls 33, the hooks 64 fixed to the top edges of the curtains will be carried onto the chain as heretofore described, so that the top of the curtains will be supported. In the movement of the battens in the opposite direction or towards the rolls 33 with which they cooperate, the hooks 64 are disengaged from the chain by the change in perpendicular direction of the chain which permits the curtains with the hooks thereon to wrap up on the rolls 33 under the influence of the pulley weights 57.

In this manner the top curtain 18 and the side curtains 39 can be rapidly and easily operated either simultaneously or individually to vary the shape or area of the screen 13.

While the invention has been particularly described and illustrated as applied to modifying a moving picture screen, it will be apparent that the principles thereof are readily applicable to modifying or controlling the shape and area of stage openings or other display devices. The light-absorbing masking material used for the curtains in the above description would, of course, in these modifications be replaced by any desired curtain material. The construction as described secures a free and easy movement of the mask and maintains the side masks in true vertical position at all times.

As many changes could be made in the construction, it is intended that all matter contained in the above description or illustrated in the accompanying drawings shall be interpreted as illustrative only and not in a limiting sense. Accordingly, various modifications of the invention can be resorted to without departing from the spirit of the invention or the scope of the appended claims.

What is claimed is:

1. In apparatus of the class described, a curtain adapted to bound one side of a display, a roll upon which the curtain is rolled, a batten, the free edge of said curtain being fixed to said batten, means tending to yieldably turn said roll to roll said curtain thereon, chain means to move the batten to and from the roll, and means for supporting a normally unsupported edge of the curtain on the batten moving chain as it is unrolled from the roll.

2. In apparatus of the class described, a curtain adapted to bound one side of a display, a roll upon which the curtain is rolled, a batten, the free edge of said curtain being fixed to said batten, means tending to yieldably turn said roll to roll said curtain thereon, chain means to move the batten to and from the roll, and means for supporting a normally unsupported edge of the curtain on the batten moving chain as it is unrolled from the roll, said supporting means comprising hooks on the edge of the curtain, said chain means being relatively offset adjacent the rolls to disengage the hooks therefrom.

3. In apparatus of the class described, a plurality of curtains adapted to bound a plurality of sides of a display, a plurality of rolls, each curtain being wrapped on a roll, battens for supporting the free edge of each curtain, means slidably supporting the ends of said battens, means tending to yieldably rotate each of said rolls to roll the respective curtains thereon, chain means to move the battens to and from said rolls, and means for supporting normally unsupported edges of the curtains on the chain means for moving the battens as the curtains are unrolled from the rolls, said chain means being supported to move inwardly of the edges of the curtain adjacent the rolls to disengage the chain means and the curtain supporting means.

4. In apparatus of the class described, a curtain adapted to bound one side of a display, a batten, one edge of the curtain being fixed to said batten, means for carrying the side of the curtain opposite the batten, means controlling the position of the batten, and means for supporting a normally unsupported edge of the curtain on the means controlling the position of the batten when the curtain is in an extended position and an offset in said batten positioning means to engage and disengage said curtain supporting means therefrom during the movement of the batten to and from the extended position of the curtain.

5. In apparatus of the class described, a curtain adapted to bound one side of a display, a frame to which one edge of the curtain is secured, a shaft journaled on said frame, a plurality of spaced flanged pulleys on said shaft, tapes wound on said pulleys, the free end of each of said tapes being secured to the edge of the curtain opposite the side fastened to the frame, a plurality of spaced loops slidably securing each of said tapes to the body of the curtain, and means for rotating said shaft whereby the effective size of the curtain can be varied, the loops being picked up in turn to fold pleats in the curtain.

6. In apparatus of the class described, a curtain adapted to bound the upper side of a display, a frame to which the upper edge of the curtain is secured, a shaft journaled on said frame, a plurality of spaced flanged pulleys on said shaft, tapes wound on said pulleys, the free end of each of said tapes being secured to the lower edge of the curtain, a plurality of spaced loops slidably securing each of said tapes to the body of the curtain, and means for rotating said shaft whereby the effective size of the curtain can be varied, the loops being picked up in turn to fold pleats in the curtain.

7. In apparatus of the class described, a curtain adapted to bound the upper side of a display, a frame to which the upper edge of the curtain is secured, a shaft, a plurality of spaced flanged pulleys on said shaft, tapes wound on said pulleys, the free end of each of said tapes being secured to the lower edge of the curtain, a plurality of loops slidably securing said tapes to the body of the curtain, and means for rotating said shaft whereby the effective size of the curtain can be varied, the loops being picked up to fold pleats in the curtain.

8. In apparatus of the class described, a curtain adapted to bound the upper side of a display, a frame to which the upper edge of the curtain is secured, a shaft, a flanged pulley on said shaft, a tape wound on said pulley, the free end of said tape being secured to the lower edge of the curtain, a plurality of loops slidably securing said tape to the body of the curtain, and means for rotating said shaft whereby the effective size of the curtain can be varied, the loops being picked up to fold pleats in the curtain.

9. In combination in apparatus of the class described, a curtain adapted to bound the top of a display means for supporting said curtain from the upper edge thereof, a plurality of spaced tapes secured at one end to the bottom edge of said curtain, a plurality of spaced loops slidably securing each of said tapes to back of the curtain, and means for winding up said tapes to control the position of said curtain.

10. In combination in apparatus of the class described, a curtain adapted to bound the top of a display means for supporting said curtain from the upper edge thereof, a plurality of spaced tapes secured at one end to the bottom edge of said curtain, a plurality of spaced loops slidably securing each of said tapes to the back of the curtain, means for winding up said tapes to control the position of said curtain, and a curtain adapted to bound one side of the display, a roll upon which said side curtain is rolled, a batten, the free edge of said curtain being secured to said batten, means tending to yieldably turn said roll to wind the side curtain thereon, and means to move the batten to and from the roll.

11. In combination in apparatus of the class described, a curtain adapted to bound the top of a display means for supporting said curtain from the upper edge thereof, a plurality of spaced tapes secured at one end to the bottom edge of said curtain, a plurality of spaced loops slidably securing each of said tapes to the back of the curtain, means for winding up said tapes to control the position of said curtain, and a curtain adapted to bound one side of the display, a roll upon which said side curtain is rolled, a batten, the free edge of said curtain being secured to said batten, means tending to yieldably turn said roll to wind the side curtain thereon, means to move the batten to and from the roll, and means for supporting the top edge of the side curtain as it is unrolled from the roll.

12. In combination in apparatus of the class described, a curtain adapted to bound the top of a display means for supporting said curtain from the upper edge thereof, a plurality of spaced tapes secured at one end to the bottom edge of said curtain, a plurality of spaced loops slidably securing each of said tapes to the back of the curtain, means for winding up said tapes to control the position of said curtain, and a curtain adapted to bound one side of the display, a roll upon which said side curtain is rolled, a batten, the free edge of said side curtain being secured to said batten, means tending to yieldably turn said roll to wind the side curtain thereon, means to move the batten to and from the roll, and means for supporting the top edge of the side curtain on the batten moving means as it is unrolled from the roll.

13. In an adjustable curtain structure, the combination of a flexible screen modifier movable horizontally, a roll on which the screen modifier is wound, a plurality of spaced supporting devices on the upper edge of the screen modifier, and a chain to move the screen modifier, the supporting devices being received over the chain as the modifier is unwound.

EARL J. VALLEN.